United States Patent
Kim et al.

(10) Patent No.: US 6,721,504 B2
(45) Date of Patent: Apr. 13, 2004

(54) METHOD FOR REQUESTING GRANT FOR MAC PROTOCOL IN PON

(75) Inventors: Jin-Hee Kim, Taejeon (KR); Hae Chung, Kumi-shi (KR); Gun-Il Yoo, Taejeon (KR); Sang-Ho Koh, Taejeon (KR); Sun-Cheol Gweon, Taejeon (KR)

(73) Assignee: Korea Telecom, Seoul (KR)

( * ) Notice: Subject to any disclaimer, the term of this patent is extended or adjusted under 35 U.S.C. 154(b) by 593 days.

(21) Appl. No.: 09/735,797

(22) Filed: Dec. 14, 2000

(65) Prior Publication Data

US 2002/0030875 A1 Mar. 14, 2002

(30) Foreign Application Priority Data

Jul. 31, 2000 (KR) .................................. 2000-44408

(51) Int. Cl.[7] .............................................. H04J 14/02
(52) U.S. Cl. ............................ 398/58; 398/98; 398/63
(58) Field of Search ........................... 398/58, 98, 63, 398/5, 135, 161, 108

(56) References Cited

U.S. PATENT DOCUMENTS 5,790,287 A * 8/1998 Darcie et al. ................ 398/108
5,930,018 A * 7/1999 Effenberger ................. 398/161
6,198,558 B1 * 3/2001 Graves et al. ............... 398/135
6,288,806 B1 * 9/2001 Touma et al. ................... 398/5

* cited by examiner

Primary Examiner—Leslie Pascal
Assistant Examiner—David C Payne
(74) Attorney, Agent, or Firm—Staas & Halsey LLP

(57) ABSTRACT

A method for requesting a grant for Medium Access Control (MAC) being applied to a Passive Optical Network (PON) system. The method includes the steps of: a) deciding a period of a mini slot ($T_{ms}$), which is necessary for a plurality of Optical Network Units (ONU) to transmit upstream cells to an Optical Line Termination (OLT); b) deciding a period of a divided slot ($T_{ds}$) and a link overhead (Co) based on the period of the mini slot ($T_{ms}$); c) calculating a length of the mini slot based on information to be transmitted to the OLT and a protocol being used; and d) requesting a grant for a MAC protocol between the plurality of the ONUs by calculating and allocating optimal parameters based on the length of the mini slot.

7 Claims, 6 Drawing Sheets

FIG. 4

| | | | |
|---|---|---|---|
| 1 | IDENT | 25 | GRANT20 |
| 2 | SYNC1 | 26 | GRANT21 |
| 3 | SYNC2 | 27 | CRC |
| 4 | GRANT1 | 28 | GRANT22 |
| 5 | GRANT2 | 29 | GRANT23 |
| 6 | GRANT3 | 30 | GRANT24 |
| 7 | GRANT4 | 31 | GRANT25 |
| 8 | GRANT5 | 32 | GRANT26 |
| 9 | GRANT6 | 33 | GRANT27 |
| 10 | GRANT7 | 34 | CRC |
| 11 | CRC | 35 | MSG_PON_ID |
| 12 | GRANT8 | 36 | MSG_ID |
| 13 | GRANT9 | 37 | MSG_FIELD1 |
| 14 | GRANT10 | 38 | MSG_FIELD2 |
| 15 | GRANT11 | 39 | MSG_FIELD3 |
| 16 | GRANT12 | 40 | MSG_FIELD4 |
| 17 | GRANT13 | 41 | MSG_FIELD5 |
| 18 | GRANT14 | 42 | MSG_FIELD6 |
| 19 | CRC | 43 | MSG_FIELD7 |
| 20 | GRANT15 | 44 | MSG_FIELD8 |
| 21 | GRANT16 | 45 | MSG_FIELD9 |
| 22 | GRANT17 | 46 | MSG_FIELD10 |
| 23 | GRANT18 | 47 | CRC |
| 24 | GRANT19 | 48 | BIP |

FIG. 5

| $L_m$ | $n_{ms}=[56/L_m]$ | $n_{ds}=[64/n_{ms}]$ | $T_{ds}=T_{ms}/n_{ds}$ | $C_o=T_f/(53T_{ds})$ |
|---|---|---|---|---|
| 4 | 14 | 5 | $0.80T_f$ | 2.4% |
| 5 | 11 | 6 | $0.67T_f$ | 2.8% |
| 6 | 9 | 8 | $0.50T_f$ | 3.8% |
| 7 | 8 | 8 | $0.50T_f$ | 3.8% |
| 8 | 7 | 10 | $0.40T_f$ | 4.7% |
| 9 | 6 | 11 | $0.36T_f$ | 5.2% |
| 10 | 5 | 13 | $0.31T_f$ | 6.1% |

FIG. 6

| $L_m$ | $n_{ms}=[56/L_m]$ | $n_{ds}=[32/n_{ms}]$ | $T_{ds}=T_{ms}/n_{ds}$ | $C_o=T_f/(53T_{ds})$ |
|---|---|---|---|---|
| 4 | 14 | 3 | $1.33T_f$ | 1.4% |
| 5 | 11 | 3 | $1.33T_f$ | 1.4% |
| 6 | 9 | 4 | $1.00T_f$ | 1.9% |
| 7 | 8 | 4 | $1.00T_f$ | 1.9% |
| 8 | 7 | 5 | $0.80T_f$ | 2.4% |
| 9 | 6 | 6 | $0.66T_f$ | 2.8% |
| 10 | 5 | 7 | $0.57T_f$ | 3.3% |

FIG. 7

| BIT 8 | BIT 7 | BIT 6~1 | GRANT | REMARKS |
|---|---|---|---|---|
| 1 | 1 | 111111 | IDLE | FIXED IN G.983.1 |
| | | 111110 | UNASSIGNED | |
| | | 111101 | RANGING | |
| | | 111100~001000 | RESERVED | FUTURE |
| | | 000111~000000 (MAXIMUM 8) | DIVIDED SLOT | |
| 0 | 0 | OLT ALLOCATES (MAXIMUM 64) | PLOAM | ENCODING |
| | 1 | OLT ALLOCATES (MAXIMUM 64) | CBR CELL | |
| | 0 | OLT ALLOCATES (MAXIMUM 64) | VBR CELL | |

CONTROL (BIT 8 = 1) / TRAFFIC FOR USER (BIT 8 = 0)

METHOD FOR REQUESTING GRANT FOR MAC PROTOCOL IN PON

FIELD OF THE INVENTION

The present invention relates to a method for requesting grant for MAC protocol in PON and a computer readable storage medium storing instructions for executing a method for requesting a grant in an optical subscriber network in which an Optical Line Termination (OLT) connects remote Optical Network Units (ONUs) by an optical fiber and passive optical devices.

DESCRIPTION OF THE PRIOR ART

In an Asynchronous Transfer Mode—Passive Optical Network (ATM-PON) being considered as one of the representative forms of PONs, an OLT broadcasts data to ONUs through an optical fiber on which a splitter splits a string of downstream data into maximum sixty-four downstream data strings. On the other hand, upstream data strings from the ONUs is multiplexed by a combiner to be transmitted through the optical fiber to the OLT. The maximum distance between an OLT and an ONU can be extended up to 20 km. ATM-PON can be deployed in the forms such as Fiber-to-the-Cabinet (FTTCab), Fiber-to-the-Home (FTTC), Fiber-to-the-Building (FTTB), and Fiber-to-the-Home (FTTH), according to the place in which an ONU is installed and the processing capacity of an ONU. Especially, an ONU, such as FTTH which is installed in a home, is called an Optical Network Termination (ONT). In addition, ATM-PON supports 155.52 Mbps or 622.04 Mbps as a downstream transmission bit rate, and 155.52 Mbps as an upstream transmission bit rate. Furthermore, variable transmission bit rates for both downstream and upstream data can be allocated to respective ONUs on a permit basis by an OLT.

As important techniques in ATM-PON, there are "ranging" and MAC protocols. Downstream data in ATM-PON can be transmitted without special difficulties except to a security problem, because the downstream data does not suffer cell collisions that can be occurred by different time delays due to different distances between an ONU and respective ONUs. However, upstream data transmission from ONUs is not free from the cell collision problem, because upstream data strings, arrived at a combiner, from different distances would contend to simultaneously occupy a certain location in a cell frame. Even though it's desirable for ATM-PON to have means to solve the problem, passive devices such as a splitter and a combiner do not have the means.

Therefore, "ranging" protocol has been devised to solve the problem, and the protocol was selected as an international standard. In the "ranging" protocol, an OLT senses a newly registered ONU; then, measures the distance from the ONU; calculates an appropriate equalized delay for the ONU; and allocates the equalized delay to the ONU. Because of the time delay adjustment by the OLT, all ONUs connected with the OLT can be considered as located at the same distance.

However, MAC protocol in ATM-PON, which dynamically allocates appropriate bit rates to respective ONUs, has not been standardized yet. The MAC protocol comprises Grant Request Protocol (GRP) and Grant Distribution Algorithm (GDA). The GRP is a process and procedure in which an ONU transmits its information to an OLT in order to receive time slots for its upstream cell (data) transmission, and in which the OLT gives a grant for cell (data) transmission with appropriate time slots. The GDA is an algorithm which distributes grants by an appropriate method based on information from ONUs, before the OLT gives the grant for cell transmission.

Referring to FIG. 3, an ATM-PON upstream frame comprises successive fifty-three time slots, and each time slot comprises fifty-six bytes that includes a three byte overhead and a fifty-three byte cell. The three byte overhead is used to maintain a specific span between two successive cells, and to synchronize bits or bytes.

On the other hand, an ATM-PON downstream frame, which is successively repeated, in accordance with the International Standard comprises successive fifty-six time slots, and each time slot has fifty-three bytes which is identical with an ATM cell.

In an ATM-PON downstream frame, the first and twenty-ninth time slots among fifty-six time slots are periodically occupied by Physical Layer Operation and Maintenance (PLOAM) cells. A PLOAM cell header is generally identical with a Physical Layer cell, but a Payload Identifier is coded to 110 which identifies the PLOAM cells as an Operation and Maintenance (OAM) cell for ATM-PON.

Referring FIG. 4, the forty-eight byte payload structure of the PLOAM cell will be explained as in the following.

First, the "IDENT" field specifies whether the present location of the PLOAM cell in an ATM-PON downstream frame is in the first time slot or the twenty-ninth time slot.

Second, the "SYNC1" and "SYNC2" fields that follow the "IDENT" field are for providing a standard clock of 1 KHz.

Third, the other fields are roughly divided to both grant fields and message fields. The grant fields have information about who can use a specific time slot. In greater detail, GRANT k ($1 \leq k \leq 27$) of the j th (j=1,2) PLOAM cell means that an entity (which may not be an ONU) to which is allocated GRANT K as an entity's ID is now using the 27(j−1)+k th time slot among fifty-three upstream time slots.

The last grant (GRANT 27) of the second PLOAM cell, namely in case of "j=2, k=27," is allocated nothing, because an upstream frame comprises only fifty-three time slots. Upstream transmission grants given from an OLT to an ONU in the International Standard are "ranging grant," "unassigned grant," and "idle grant," and each grant is respectively defined as "11111101," "11111110," and "11111111." The remainders of the grants can be assigned by an OLT. In the procedure for "ranging," such assignments can be performed through a message field of a PLOAM cell, and the message field is filled up with parameters and commands from an OLT to an ONU. Time slots in an upstream frame distinct from a downstream frame can be filled with user cells. Upstream PLOAM cells, and a divided slot, depending on grants that an OLT gives. Among the three kinds of time slots, a divided time slot occupies a fifty-six byte upstream time slot in which one or more of mini slots are filled out in order to efficiently use the divided time slot. Requests for grants from ONUs or other entities are filled in the mini time slots.

Therefore, the size of a mini slot can be arbitrarily fixed between one byte and fifty-three bytes. However, in fact, the undefined size and period of the mini slots cause confusion in embodiment of equipment, and put an obstacle in standardization for the equipment.

SUMMARY OF THE INVENTION

An object of the present invention is to provide a data-storing device that can be read by a computer, and that stores a method for requesting a grant in an optical subscriber network in which an Optical Line Termination (OLT) connects remote Optical Network Units (ONUs) by an optical fiber and passive optical devices.

In accordance with an aspect of the present invention, there is provided a method for requesting a grant for Medium Access Control (MAC) being applied to a Passive Optical Network (PON) system, the method comprising the steps of: a) deciding a period of a mini slot ($T_{ms}$), over which a plurality of Optical Network Units (ONU) transmit upstream cells to an Optical Line Termination (OLT); b) deciding a period of a divided slot ($T_{ds}$) and a link overhead (Co) based on the period of the mini slot ($T_{ms}$); c) calculating a length of the mini slot based on information to be transmitted to the OLT and a protocol being used; and d) requesting a grant for a MAC protocol between the plurality of the ONUs by calculating and allocating optimal parameters based on the length of the mini slot.

In accordance with another aspect of the present invention, there is provided a computer readable storage medium storing instructions for executing a method for requesting a grant for Medium Access Control (MAC) in a Passive Optical Network (PON) system having one or more processors, the method comprising the steps of: a) deciding a period of a mini slot ($T_{ms}$), which is necessary for a plurality of Optical Network Units (ONU) to transmit upstream cells to an Optical Line Termination (OLT); b) deciding a period of a divided slot ($T_{ds}$) and a link overhead (Co) based on the period of the mini slot ($T_{ms}$); c) calculating a length of the mini slot based on information to be transmitted to the OLT and a protocol being used; and d) requesting a grant for a MAC protocol between the plurality of the ONUs by calculating and allocating optimal parameters based on the length of the mini slot.

BRIEF DESCRIPTION OF THE DRAWINGS

The above and other objects and features of the instant invention will become apparent from the following description of preferred embodiments taken in conjunction with the accompanying drawings, in which:

FIG. 4 is a table showing the payload contents of a downstream PLOAM cell in the International Standard;

FIG. 5 is the first table showing overheads and periods of divided slots according to different sizes of mini slots in the present invention;

FIG. 6 is the second table showing overheads and periods of divided slots according to different sizes of mini slots in the present invention; and FIG. 7 is a table showing an encoding method for grant fields of a PLOAM cell according to the present invention.

PREFERRED EMBODIMENT OF THE INVENTION

Hereinafter, preferred embodiments of the present invention will be described in detail with reference to the accompanying drawings.

Figure 1:
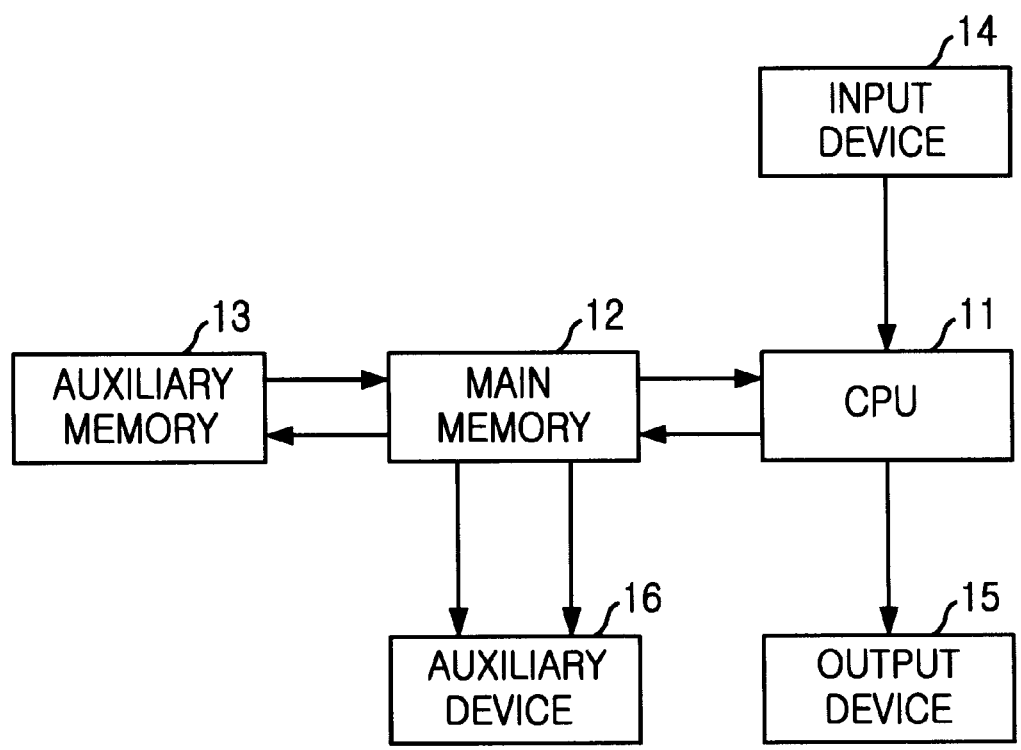
FIG. 1 is a block diagram showing a hardware system in accordance with an embodiment of the present invention.
Figure 2:
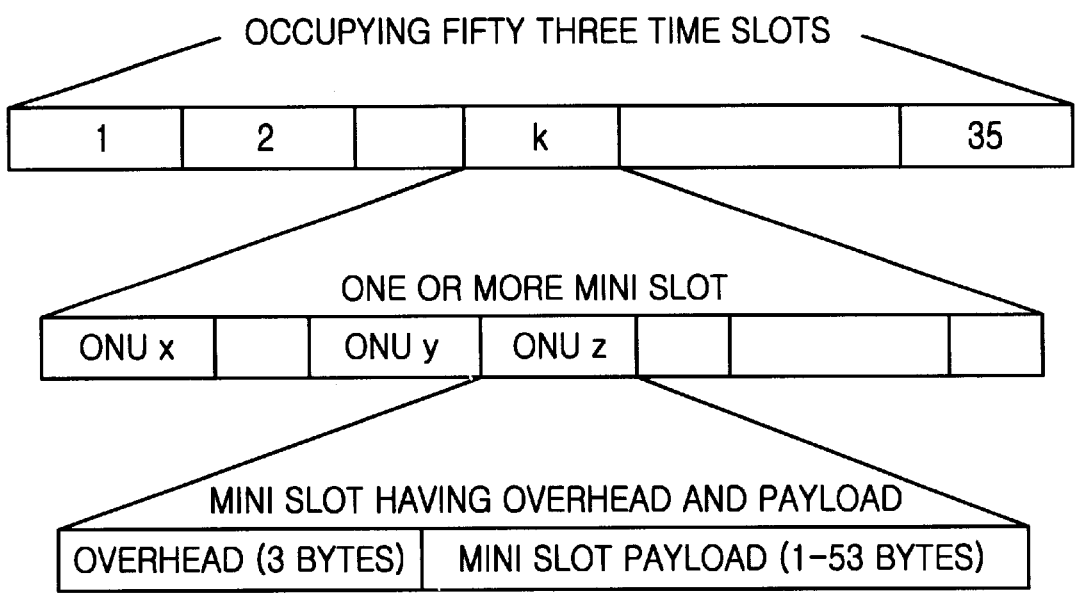
FIG. 2 is a block diagram showing a format of divided slots in the International Standard.

FIG. 1 is a block diagram showing a hardware system in accordance with an embodiment of the present invention. The hardware system comprises a Central Processing Unit (CPU) 11; a Main Memory (MM) 12 connected to the CPU 11; an Auxiliary Memory (AM) 13 connected to the MM 12; input and output devices 14 and 15 connected to the CPU 11; and an auxiliary device 16 connected to the MM 12. At this time, the CPU 11 controls the whole computer system; the MM and AM, 12 and 13, store a variety of data being used and occurred during processing jobs; the input and output devices 14 and 15 are used for data input and output works; and the auxiliary device is used to interface the computer system with other equipment. In addition, the AM 13 is also used to store a large amount of data, and the input and output devices 14 and 15 can include keyboards, displays, printers, and so forth. Especially, the MM 12 stores a program to perform the functions of requesting a grant for an ONU to send upstream cells to an OLT.

Hereinafter, before detailed explanations about the present invention will be given, several basic explanations are given.

First, for the operation of MAC protocol, it should be decided what kinds of entities should be used as identifiers for grants. As is referred in FIG. 4, a total of two-hundred-fifty-six grants can be distinguished, because each grant field in the International Standard comprises one byte. In the International Standard, three kinds of grants have already been defined. Grants for upstream cells and divided slots as well as traffic cells should be provided to the entities that want grants. Thus, the total of two-hundred-fifty-six grants is not enough to provide grants for all virtual channels and paths that want grants. Furthermore, providing grants for entities of User Network Interfaces (UNIs, that is, TB Interfaces) would be more problematic, because a large capacity of ONU can accommodate one hundred and more subscribers. Therefore, it is desirable that an OLT and ONUs are used as entities that can be identified by the MAC protocol.

Second, it should be decided what kind of information an ONU transmits to an OLT over a mini slot. The simplest method for an OLT to provide a grant is that the OLT provides the grant allocating a fixed bandwidth to the ONU without any information from the ONU. Even though the method is simple in embodiment, the link efficiency in the method lessens, because the method will lose the advantage of a statistical multiplex being occurred among multiple ONUs. On the other hand, in order to obtain the advantage of the statistical multiplex, Either a method to use traffic parameters used by an ATM layer, or a method to use a queue length, can be used. Even though the method to use ATM traffic parameters increases the link efficiency, it causes to increase a manufacturing cost because of the complexity in embodiment. Therefore, the method to use a queue length is commonly used for solving the problems of both the manufacturing cost and the link efficiency. In the result, the present invention selects the method to transmit a queue length, because the MAC protocol in the ATM-PON is a sublayer (TC layer) protocol in the ATM network, and, accordingly, the MAC protocol can independently perform its functions regardless of the ATM protocol.

Lastly, it should be decide what kind of method in order to transmit the information about a queue length should be used. The method would be closely related to a frame structure. It is possible to use a frame structure in which the information about a queue length can be transmitted over a preamble of an upstream cell, and a grant can be transmitted over a preamble of a downstream cell. However, in the International Standard, the information about an ONU is transmitted over an upstream divided slot, not a preamble of an upstream cell, and a grant is periodically transmitted over a downstream PLOAM cell, not a preamble of a downstream cell. Therefore, it is desirable to periodically transmit the information about a queue length of an ONU over a mini slot in a divided slot.

Based on the three basic decisions, a method to decide the period of a mini slot, as the first step of the present invention, will be explained as in the following.

When an ONU transmits the information about a queue length, it is critical to decide the period for transmission of the information. In order to decide the period, it is necessary to consider both the link efficiency and the time responding to a request. If the period is short enough, even though an OLT can promptly provide a grant responding to a request, a link capacity should be rapidly spent. On the other hand, if the period is long enough, even though the consumption of the link capacity lessens, the service quality of a network would be degraded due to delayed departures and arrivals of cells from an ONU. Therefore, finding an appropriate period is important, and is also related with a "ranging" protocol.

In order to explain about the "ranging" protocol, the parameters followed will be used.

First, $T_{pd}$ is a propagation delay between an OLT and an ONU. Second, $T_{res}$ is a response time of an ONU. Third, Td is an equalized delay. Fourth, $T_{eqd}$ is an equalized round trip delay.

If an OLT provides a cell grant over a PLOAM cell, the PLOAM cell will arrive at an ONU after a propagation delay $T_{pd}$. The propagation delay $T_{pd}$, which is a time to transmit a signal through an optical fiber between an OLT and an ONU, is different depending on a distance between an OLT and an ONU. If the maximum distance between an OLT and an ONU is 20 Km, the maximum propagation delay between them is 100 $\mu$s, because the transmission speed over an optical fiber is two-thirds of the vacuum speed. Because an OLT broadcasts a signal to all ONUs, the all ONUs will receive the signal and analyze it. The response time $T_{res}$ is a total processing time from when an ONU receives a PLOAM cell from up to when it transmits an appropriate response. It takes a seven to nine cell time, in which each cell comprises fifty-six bytes, for the response time $T_{res}$ of an ONU. Even though an OLT allocates different time slots for respective ONUs, collisions among the different time slots can be occurred in a section in which an optical fiber is shared by the ONUs, because different propagation delays can be occurred from the ONUs that are located at different distances from the OLT.

In order to avoid the collision problem, when an ONU newly connected to a PON starts to operate, a ranging process is performed. The purpose of the process is for allocating an equalized delay $T_d$ to the newly connected ONU. The equalized delay $T_d$ makes the OLT to consider all ONUs to be at the same distance from the OLT. In other words, an ONU located near from the OLT shall transmit data with a longer delay, but an ONU located far from the OLT shall transmit data with a shorter delay. In the result, an equalized round trip delay $T_d$ means a time from when an OLT sends a grant to an ONU up to when a cell transmitted from the ONU arrives at the OLT, and the same delay time which can be equally applied to all ONUs regardless of their distances from the OLT, which can be expressed as following equation (1).

$$T_{eq}=T_{pd}+T_{res}+T_d+T_{pd}=2T_{pd}+T_{res}+T_d \quad (1)$$

At the formula 1, even though $T_{pd}$ may be different from $T_{res}$, by "ranging" allocating an adjusted $T_d$ to an ONU, an equalized round-trip delay ($T_{eq}$) is obtained. In the result, MAC protocol is operated on the basis of the "ranging" protocol.

Figure 3:
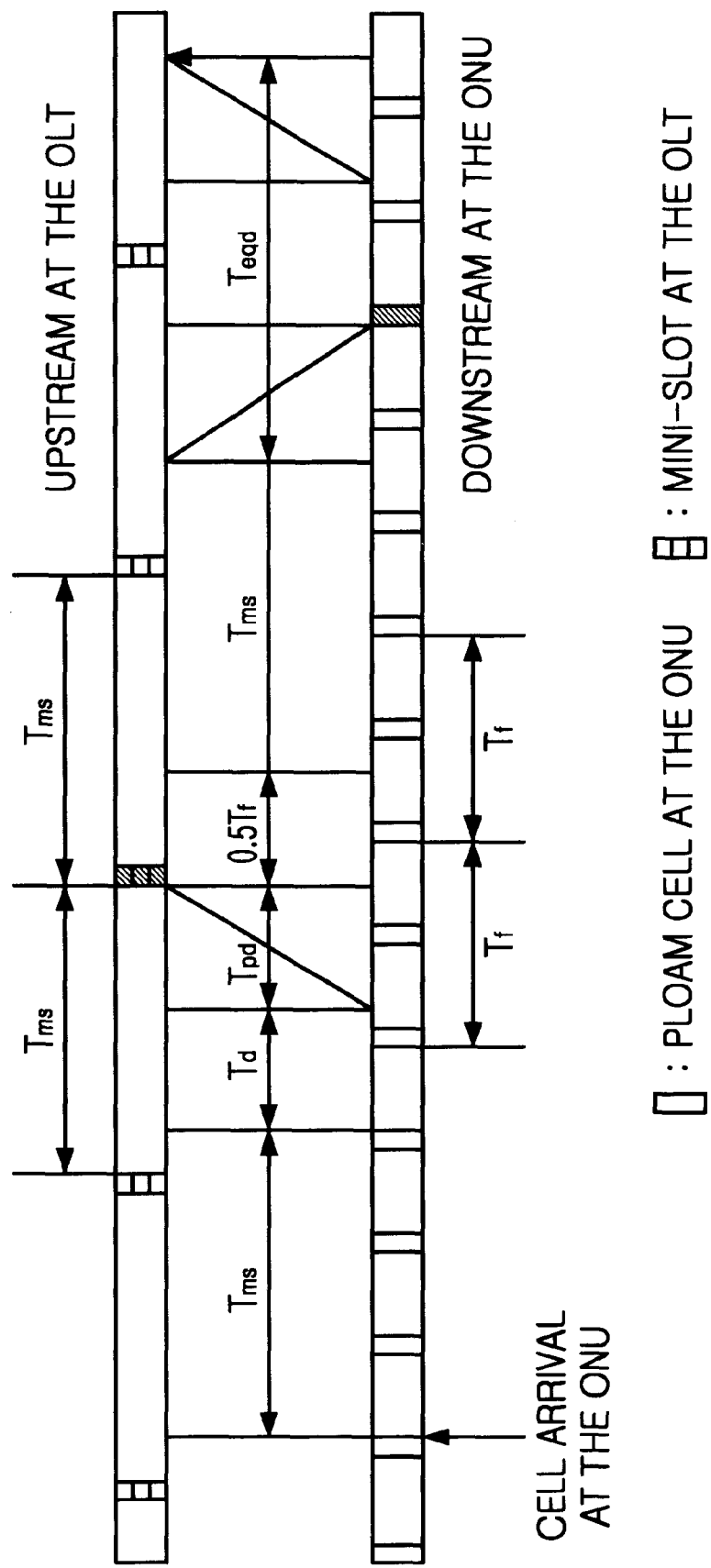
FIG. 3 is an illustration depicting the maximum cell delay in the present invention.

Referring to FIG. 3, how to decide the period of a mini slot as defined as $T_{ms}$ is explained below.

If the period of a downstream frame is $T_f$, a PLOAM cell in the downstream frame arrives at an ONU every $0.5T_f$. If the period of a mini slot is $T_{ms}$, a mini slot from an ONU arrives at an OLT every $T_{ms}$. Whenever a mini slot arrives at an OLT, the OLT performs a scheduling job based on the information about queue length in the mini slot from an ONU, and then the information about the scheduling transmitted by the OLT is received by the ONU every $0.5T_f$. Therefore, even though an ONU transmits a mini slot containing the information about its queue length faster than $0.5T_f$, it is nothing but to spend a link capacity. In the result, the minimum period of a mini slot shall be 0.5 $T_f$.

In order to decide the maximum period of a mini slot, all the situations in which delays can be occurred. Referring to FIG. 3, all the situations is explained.

First, if, before a certain cell arrives at an ONU, a mini slot has left from the ONU, the ONU should wait during $T_{ms}$ in order to send the information about the certain cell. A mini slot leaves from an ONU after an equalized delay $T_d$, and it will arrive at an OLT after a propagation delay $T_{pd}$.

Second, an OLT is assumed to spend at least 0.5 $T_f$ for the scheduling job, because it should transmit a grant over a PLOAM cell every 0.5 $T_f$. The OLT is also assumed to provide its service within $T_{ms}$ after the scheduling job, because the cells in a mini slot usually will be arrived within a period of the mini slot. It means that a delay of $T_{ms}$ should be added to the maximum period of a mini slot, because the maximum delay in this occasion would mean that the OLT provides a grant over the last field of the last downstream PLOAM cell. After that, as stated at the "ranging" procedure above, a cell in an ONU buffer arrives at an OLT after $T_{eqd}$ has been spent since a grant was given.

As already explained, if $T_{max}$ is defined as the maximum delay of a cell arrived at an ONU, the equation, $T_{max}=2T_{ms}+T_d+0.5\ T_f+T_{eqd}$, can be obtained. If $T_d$ of the equation is replaced by the equation (1), equation (2) can be obtained.

$$T_{max}=2T_{ms}+2T_{eqd}-T_{pd}-T_{res}+0.5T_f \quad (2)$$

As a result, the period of the mini slot is expressed as following equation (3).

$$\frac{T_f}{2} \leq T_{ms} \leq \frac{T^{max} - 2T_{eqd} + T_{pd} + T_{res} - 0.5T_f}{2} \quad (3)$$

Considering real-time traffics between the end nodes in ATM network, it would be desirable for the maximum delay $T_{max}$ to be no greater than 2 ms. The equalized round-trip delay basically is more than 1.5 $T_f$. If an OLT needs to arrange an upstream and downstream frame starting time, it will take at least 2.0 $T_f$. Because the minimum value of $T_{pd}$ would be occurred at 0 Km, the minimum value of $T_{pd}$ is 0 s, and, as already mentioned, the minimum value of $T_{res}$ is a seven cell time.

Because ONUs in ATM-PON synchronize their clocks with downstream frames from an OLT, it's convenient to express by a unit frame the period of the mini slot at the equation (3). In the International Standard, the upstream frame comprises fifty-three time slots, and, except to divided slots, each time slot comprises a three byte preamble and a fifty-three byte cell. Because the upstream transmission time is 155.52 Mbps, an upstream frame time $T_f$ is 152.675 $\mu$s. In the result, the scope of a mini slot period is $0.5T_f \leq T_{ms} \leq 4.366T_f$.

Because it would be complex to establish means for deciding a specific period of a mini slot from the above-obtained scope of a mini slot period, the present invention gives "granularity" to the scope of a mini slot period, and embodying the means accordingly will be easier. Therefore, the period of a mini slot is decided to $T_{ms}=0.5$ m $T_f$ ($1 \leq m \leq 8$, m is an integer)." By making the period of a mini slot become one of the multiple numbers of a downstream PLOAM cell period, a grant period for an OLT to allocate a mini slot to an ONU can be synchronized to the downstream PLOAM cell period.

A method to decide the period of a mini slot, as the first step of the present invention, is as mentioned above.

Hereinafter, as the second step of the present invention, a method to decide the period of a divided slot and a link overhead will be explained. Both the period of a divided slot and the link overhead is decided based on the period of a mini slot which is obtained at the first step.

The size of mini slot, the number of mini slots in a divided slot, the number of divided slots needed within a period of a mini slot, the period of a divided slot, and link overhead are defined respectively as $L_m$, $n_{ms}$, $n_{ds}$, $T_{ds}$, and Co.

At this time, the number of mini slots in a divided slot is $n_{ms}=[56/L_m]$. Here, [x] means the minimum number among integers greater than x. If $N_u$ is the total number of ONUs connected to an OLT, the number of divided slots needed within a period of a mini slot is $n_{ds}=[N_u/n_{ms}]$. In the result, the period of a divided slot is $T_{ds}=T_{ms}/n_{ds}$, because divided cells of $n_{ds}$ are needed within a period of a mini slot. Furthermore, $T_{ds}$ has time slots of $53T_{ds}/T_f$, because there are fifty-three time slots within a frame time $T_f$. It means that a time slot should be used for a divided time slot every $53T_{ds}/T_f$. Therefore, link overhead is Co=$T_f/53T_{ds}$.

Hereinafter, a method to decide the length of a mini slot, as the third step of the present invention, will be explained.

The length of a mini slot depends on the operational mode of a protocol to be used and the information to be transmitted. In the present invention, a field in a mini slot has the information about a queue length. However, according to a protocol to be used, the meaning of the information about a queue length can be differently interpreted. For the queue length, both a method to count the number of cells which is arrived within a period of a mini slot (the number of cells arrived before a mini slot is transmitted), and a method to count the total number of cells which is remained in a buffer, can be considered. It is the advantage of the former that a field size for recording a queue length is relatively small, but it is the disadvantage of the former that embodying the method is complex.

However, in case of the latter, even though the size of a mini slot is relatively large, the queue length in a mini slot arrived at an OLT is the present queue length of an ONU. In the result, the latter is simple in design, and tolerant in error, because, even though a mini slot is disposed due to an error, another exact queue length of an OUU can be transmitted over the next mini slot.

In ATM-PON based on the International Standard, all of the two methods can be applied. Therefore, for a design to satisfy the both of them, the size of a mini slot should be decided based on the latter, because the mini slot size of the latter is relatively large. In addition, The size of a field for a queue length in a mini slot should be decided based upon the maximum size of cell buffers that are needed by ONUs. The maximum size of a cell buffer for a TC layer can be decided considering a situation (a situation in which a cell having the same speed with an upstream transmission speed arrives) in which an ONU uses the whole bandwidth with a priority over all the other ONUs. It is not necessary to consider the situation in which an ONU uses the whole bandwidth and a cell is faster than the upstream transmission speed.

Under the premises as above, the time from when a cell arrives at a vacant queue in an ONU up to when the cell will be served by the ONU will be calculated as in the following.

Referring to FIG. 3, if a certain cell arrives at an ONU as soon as a mini slot left, in order for the information about the cell to arrive at an OLT, $T_{ms}+T_d+T_{pd}$ is spent. After the scheduling time of Tf/2, the OLT will send a grant over a PLOAM cell, and, after $T_{pd}$, the ONU will receive a PLOAM cell including a grant. As already mentioned, after $T_{res}$ for processing the PLOAM cell, the ONU can transmit upstream user traffic. After this, because all cells which has arrived at an ONU can receive a grant, arrivals of cells and grants reach equilibrium. In the result, $T_{es}$, the time to reach to the equilibrium after the first cell arrival and grant from the OLT is shown as following equation (4).

$$T_{es}=T_{ms}+T_d+T_{pq}+0.5T_f+T_{pd}=T_{ms}+T_{eqd}+0.5T_f \tag{4}$$

The equation (4) means that the time from a cell arrival up to right before a service for the cell is the same as the summation of an equalized delay (Td) and the scheduling time at the OLT. If errors continuously occurs i times in an upstream-transmitted mini slot through an optical fiber, the time up to the service for the cell can be obtained by transformation of the equation (4), as following equation (5).

$$T_{es}^1=(i+1)T_{ms}+T_{eqd}+0.5T_f \tag{5}$$

However, because the bit error rate of an optical fiber is extremely low, if it is given the assumption that continuous disposals more than twice would not occur, i is decided as 1, so $T_{es}^1=2T_{ms}+T_{eqd}+0.5T_f$ is obtained. As above stated, the maximum size of cell buffers is the same as the size of buffers in which cells incoming in 155.52 Mbps can be stored. Therefore, because fifty-three cells arrive during the period of a frame, the size of a buffer required on TC layer, QTC, is expressed by as following equation (6).

$$Q_{TC} = \frac{53(2T_{ms} + T_{eqd} + 0.5T_f)}{T_f} \tag{6}$$

If $l_q$ and $l_a$ are respectively defined as the lengths of fields which are needed to code a queue length and to perform supplementary function such as an error check, $l_q$ can be expressed as $l_q=[\log_2 Q_{TC}]$. From the equation, the length of a mini slot including a three byte mini slot overhead can be calculated as following equation (7).

$$L_m=3+[(l_q+l_a)/8](bytes) \tag{7}$$

Hereinafter, as the last step of the present invention, the procedure to decide and allocate optimum parameters will be explained.

Above all, the step to decide an optimum parameter will be explained. The optimum parameter can be decided based on the above-stated formulations. According to the International Standard, "$T_{ms}=4.0T_f$" should be satisfied even under the condition in which an OLT accommodates sixty-four ONUs.

FIG. 5 is a table showing overheads and periods of divided slots according to different sizes of mini slots in the present invention. The result in the table was obtained under the condition in which an OLT accommodates sixty-four ONUs. Therefore, under the condition of "N=64" and "$T_{ms}$=4.0 $T_f$," FIG. 5 shows the number of mini slots in a divided slot, the number of divided slots needed within a period of a mini slot, the period of a divided slot, and a link overhead according to the changing size of a mini slot. Basically, a mini slot should have at least a four byte length, because a mini slot has a three byte overhead. If the size of a mini slot increases, the number of mini slots in a divided slot decreases. Therefore, the number of divided slots needed within a period of a mini slot increases; the period of a divided slot is shorten; and, in the result, a link overhead increases. In case of the mini slots of six bytes and seven bytes, the reason in which the $n_{ds}$ for each case is same in spite of different $n_{ms}$ is that, when the numbers of mini slots which can be entered into a divided slot are respectively nine and eight, the number of needed within a period of a mini slot is equal.

FIG. 6 is a table showing overheads and periods of divided slots according to changing sizes of mini slots in the present invention. The result was obtained under the condition in which an OLT accommodates thirty-two ONUs. Generally, FIG. 6 has a similarly changing trend with the FIG. 5. However, because the number of divided slots needed within a period of a mini slot is smaller than in the FIG. 5, the period of the divided slot is lengthened, and, in the result, the link overhead can be maintained at the level of a half compared to the result of the FIG. 5.

At this time, the size of a mini slot can be calculated by the equations 6 and 7. In case of "$T_{ms}$=4.0$T_f$" and "$T_{eqd}$=2.0$T_f$," $Q_{TC}$ is 556.5, and so the number of buffers for TC layer is 557. Therefore, the size of a field for coding the queue length is "$l_q$=[$\log_2$ 557]=10 (bits)." It means that the size of a mini slot should be at least five byte. Furthermore, considering an error check field and future uses, a six byte mini slot can be selected. In order to accommodate more traffic classes having different service qualities, a seven byte mini slot can be selected.

Therefore, as shown in FIGS. 5 and 6, in case the sizes of mini slots are respectively six and seven, the mini slot size of seven is more advantageous, because both the periods of divided slots and the link overheads for each case is same. At this time, selecting seven as the size of mini slot also gives easiness in embodiment, because the periods of both a mini slot and a divided slot become integer multiples of the downstream PLOAM cell period.

Referring to FIG. 5, when the size of a mini slot is decided as seven bytes as above stated, eight divided slots are needed in order to support sixty-four ONUs. It means that an OLT needs eight identifiers in order to provide grants for the sixty-four ONUs.

Referring to FIG. 7, based on the aforementioned reason, coding rules for a grant field are as in the following.

By the most significant bit (MSB, bit 8), network control grants and user traffic grants can be identified.

For the network control grants (bit 8=1), the second MSB (bit 7) classifies the lower bits into both grants for network controls and sixty-four upstream PLOAM grants.

In case of grants for network controls (bit 7=1), there are three kinds of grants such as an idle grant, unassigned grant, and ranging grant defined by the International Standard. At this time, In case of "bit 6=0," grants for divided slots are given to eight groups. In other words, a divided slot includes 8 mini slots, so the total of sixty-four ONUs can be identified.

For the user traffic grants (bit 8=0), if bit 7 of the grant field is 1, it means grants for Constant Bit Rate (CBR) traffic, and if the bit 7 is 0, it means grants for Variable Bit Rate (VBR) traffic. Both the grants for CBR traffic and the grants for VBR traffic identifies respectively 64 ONUs.

As above stated, a divided slot can accommodate mini slots up to nds. If ONUs of Nu (1≦Nu≦64) are in operation, using divided slots of nds (nds=[Nu/nms]) is most efficient. The ONUs that use mini slots in a same divided slot can be considered as a group, so an OLT manages an "group_id" as an identifier for a certain group.

The allocation procedure for mini slots based on the above-stated explanation is as in the following.

First, when a new ONU is registered:
among divided slots of nds in use, if a divided slot accommodating mini slots of less than nms exists, an ONU being newly registered will be given the same "group_id" as the divided slot has as well as a mini slot ID. However, if there is no divided slot having mini slots less than nms, a new "group_id" will be given, so the number of divided slots will increase.

Second, when an existing ONU is removed:
if there is no ONU that occupies a divided slot except to the ONU being removed, the divided slot ID as well as a mini slot ID that have been assigned to the ONU will be withdrawn. However, if not in the case, the mini slot ID that has been assigned will be withdrawn. And then, after all mini slots being used in all divided slots is counted, if the number of the divided slots can be reduced, that is, in case of "nds≧[Nu/Nms]," after relocating the mini slots, the number of divided slots makes to become "nds=[Nu/nms].

In order to operate under the International Standard as well as the above-stated allocation procedure, the following method can be used.

According to the International Standard, in the procedure of "ranging," after allocating the equalized delay (Td), an OLT sends an ONU a "Divided_Slot_Grant_Configuration" message over a message field of a PLOAM cell. The "DS_GR" field of the "Divided_Slot_Grant_Configuration" ("MSG_FIELD2" of a PLOAM cell) is the grant number for a divided slot that will be used by the ONU. The "DS_GR" field can be used as the "group_id" (or the divided slot ID) that is defined above. In addition, the "OFFSET" field ("MSG_FIELD4" of a PLOAM cell) of the "Divided_Slot_Grant_Configuration" shows the location of a mini slot that will be used by the ONU, and the "OFFSET" field can be used as the mini slot id. In accordance, by using the "Divided_Slot_Grant_Configuration" message, allocations and withdrawals of divided slots and mini slots can be easily performed.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for requesting a grant for Medium Access Control (MAC) being applied to a Passive Optical Network (PON) system, comprising the steps of:

a) deciding a period of a mini slot ($T_{ms}$), which is necessary for a plurality of Optical Network Units (ONU) to transmit upstream cells to an Optical Line Termination (OLT);

b) deciding a period of a divided slot ($T_{ds}$) and a link overhead (Co) based on the period of the mini slot ($T_{ms}$);

c) calculating a length of the mini slot based on information to be transmitted to the OLT and a protocol being used; and d) requesting a grant for a MAC protocol between the plurality of the ONUs by calculating and allocating optimal parameters based on the length of the mini slot, wherein, when the ONU transmits information about its queue length to the OLT, the period of the mini slot (Tms) is decided based on equations as:

$$\frac{T_f}{2} \leq T_{ms} \leq \frac{T^{max} - 2T_{eqd} + T_{pq} + T_{res} - 0.5T_f}{2},$$

$$0.5T_f \leq T_{ms} \leq 4.366 T_f \text{ and}$$

$$T_{ms} = 0.5 m T_f \ (1 \leq m \leq 8, \ m \text{ is an interger})$$

where, $T_{max}$ is a maximum delay of a cell arrived at an ONU and defined as $T_{max}=2T_{ms}+2T_{eqd}-T_{pd}-T_{res}+0.5Tf$, $T_{ms}$ is the period of a mini slot, $T_{eqd}$ is an equalized round trip delay, $T_{pd}$ is a propagation delay between an OLT and an ONU, $T_{res}$ is a response time of an ONU and $T_f$ is an upstream frame time.

2. The method as recited in claim 1, wherein in said step b), $n_{ds}$ divided slots are required within the period of the mini slot, and uses the period of the divided slot ($T_{ds}=T_{ms}/n_{ds}$) and a link overhead ($Co=T_f/(53T_{ds})$),
wherein $n_{ds}$ is the number of divided slots needed within one period of the mini slot and expressed as $n_{ds}=[Nu/n_{ms}]$, $N_u$ is a total number of the ONUs connected to the OLT; $n_{ms}$ is the number of the mini slots in the divided slot and defined as $n_{ms}=[56/L_m]$, $L_m$ is a length of one mini slot (bytes), (x) is a minimum integer number greater than x.

3. The method as recited in claim 2, wherein the length of the mini slot is calculated based on equations as:

$$Q_{TC} = \frac{53(2T_{ms} + T_{eqd} + 0.5T_f)}{T_f} \text{ and}$$

$$L_m = 3 + [(l_q + l_a)/8]$$

where, $Q_{TC}$ is a size of a buffer required on the Transmission Convergence (TC) layer, $l_q$ is a length of a field that is needed to encode a length of a queue and defined as $l_q=[\log_2 Q_{TC}]$, and $l_a$ is a length of a field which is needed to perform supplementary functions such as an error check.

4. The method as recited in claim 3, wherein said step d) includes the steps of:
d1) producing optimal parameters by using a table including the periods of divided slot and overheads according to changing sizes of mini slots; and
d2) allocating mini slots by using a coding method for a Physical Layer Operation and Maintenance (PLOAM) cell.

5. The method as recited in claim 4, wherein said step d) includes the steps of:
d1) when a new ONU is registered, if there is a divided slot of which a number of mini slots, among $n_{ds}$ divided slots in use, is less than $n_{ms}$, allocating a mini slot identifier (ID) and the same "group_id" as the divided slot has to an ONU to be newly registered so that the ONU to be newly registered uses a mini slot in the divided slot;
d2) if there is no divided slot of which the number of mini slots is less than $n_{ms}$, allocating a new "group_id" and a new mini slot identifier (ID) so that the number of divided slots is increased by one;
d3) when the ONU is released, if there is no ONU except for the ONU to be released that occupies a divided slot, releasing the divided slot ID and the mini slot ID assigned to the ONU;
d4) if there is another ONU that occupies the divided slot, only the mini slot ID is released; and
d4) after all mini slots being used in all divided slots is counted, if the number of the divided slots can be reduced, that is, in case of "nds≧[Nu/nms]," reallocating the mini slots so that the number of divided slots is nds=[Nu/nms].

6. The method as recited in claim 5, wherein, when the divided slots and the mini slots are allocated and released, a "Divided_Slot_Grant_Configuration" message is transmitted to the ONU through a message field of a PLOAM cell which is an International Standard, wherein "DS_GR" field of the "Divided_Slot_Grant_Configuration" ("MSG_FIELD2" of a PLOAM cell) is used as a "group_id" (or a divided slot ID) and wherein an "OFFSET" field ("MSG_FIELD4" of a PLOAM cell) of the "Divided_Slot_Grant_Configuration" is used as a mini slot ID.

7. A computer readable storage medium storing instructions for executing a method for requesting a grant for Medium Access Control (MAC) in a Passive Optical Network (PON) system having one or more processors, the method comprising the steps of:
a) deciding a period of a mini slot ($T_{ms}$), over which a plurality of Optical Network Units (ONU) transmit upstream cells to an Optical Line Termination (OLT);
b) deciding a period of a divided slot ($T_{ds}$) and a link overhead (Co) based on the period of the mini slot ($T_{ms}$);
c) calculating a length of the mini slot based on information to be transmitted to the OLT and a protocol being used; and
d) requesting a grant for a MAC protocol between the plurality of the ONUs by calculating and allocating optimal parameters based on the length of the mini slot, wherein, when the ONU transmits information about its queue length to the OLT, the period of the mini slot ($T_{ms}$) is decided based on equations as:

$$\frac{T_f}{2} \leq T_{ms} \leq \frac{T^{max} - 2T_{eqd} + T_{pq} + T_{res} - 0.5T_f}{2},$$

$$0.5T_f \leq T_{ms} \leq 4.366 T_f \text{ and}$$

$$T_{ms} = 0.5 m T_f \ (1 \leq m \leq 8, \ m \text{ is an interger})$$

where, $T_{max}$ is a maximum delay of a cell arrived at an ONU and defined as $T_{max}=2T_{ms}+2T_{eqd}-T_{pd}-T_{res}+0.5Tf$, $T_{ms}$ is the period of a mini slot, $T_{eqd}$ is an equalized round trip delay, $T_{pd}$ is a propagation delay between an OLT and an ONU, $T_{res}$ is a response time of an ONU and $T_f$ is an upstream frame time.

* * * * *